US010501083B2

(12) United States Patent
Nakano et al.

(10) Patent No.: US 10,501,083 B2
(45) Date of Patent: Dec. 10, 2019

(54) VEHICLE CONTROL DEVICE AND VEHICLE CONTROL METHOD

(71) Applicant: JATCO Ltd, Fuji-shi, Shizuoka (JP)

(72) Inventors: Yusuke Nakano, Yamato (JP); Yusuke Ota, Ebina (JP); Yoshimasa Nishihiro, Zama (JP); Masayoshi Nakasaki, Isehara (JP); Yukifumi Ootsuka, Isehara (JP); Takuro Kawasumi, Ebina (JP); Shintaro Oshio, Sagamihara (JP)

(73) Assignee: JATCO LTD, Fuji-Shi (JP)

( * ) Notice: Subject to any disclaimer, the term of this patent is extended or adjusted under 35 U.S.C. 154(b) by 160 days.

(21) Appl. No.: 15/553,239

(22) PCT Filed: Feb. 17, 2016

(86) PCT No.: PCT/JP2016/054558
§ 371 (c)(1),
(2) Date: Aug. 24, 2017

(87) PCT Pub. No.: WO2016/147783
PCT Pub. Date: Sep. 22, 2016

(65) Prior Publication Data
US 2018/0037231 A1    Feb. 8, 2018

(30) Foreign Application Priority Data

Mar. 17, 2015    (JP) ................................ 2015-053523

(51) Int. Cl.
*B60W 10/02* (2006.01)
*B60W 30/18* (2012.01)
(Continued)

(52) U.S. Cl.
CPC ...... *B60W 30/18136* (2013.01); *B60W 10/02* (2013.01); *B60W 10/06* (2013.01); *B60W 20/00* (2013.01); *B60W 30/18072* (2013.01); *F02N 11/00* (2013.01); *F16D 48/00* (2013.01); *F16D 48/02* (2013.01); *F16H 59/18* (2013.01); *F16H 59/40* (2013.01); *F16H 59/42* (2013.01); *F16H 61/08* (2013.01); *F16H 61/662* (2013.01);
(Continued)

(58) Field of Classification Search
None
See application file for complete search history.

(56) References Cited

U.S. PATENT DOCUMENTS

2011/0071741 A1*  3/2011  Lochocki, Jr. .......... F16H 61/20
                                                        701/58
2011/0136620 A1   6/2011  Gibson et al.
(Continued)

FOREIGN PATENT DOCUMENTS

EP      2 620 339 A1    7/2013
JP      2013-117274 A   6/2013
(Continued)

*Primary Examiner* — Justin Holmes
(74) *Attorney, Agent, or Firm* — Foley & Lardner LLP

(57) ABSTRACT

A vehicle control device includes control means for executing coasting control, in which a friction engaging element is disengaged and a rotation speed of a rotary shaft of a drive source is set at zero, when a shift range corresponds to a travel range and a coasting condition is established, and the control means executes the coasting control when the shift range is modified to a neutral range.

8 Claims, 6 Drawing Sheets

(51) Int. Cl.
  *B60W 10/06* (2006.01)
  *F16H 59/18* (2006.01)
  *F16H 59/40* (2006.01)
  *F16H 59/42* (2006.01)
  *F16H 61/08* (2006.01)
  *F16H 61/662* (2006.01)
  *F16H 61/686* (2006.01)
  *F16D 48/02* (2006.01)
  *B60W 20/00* (2016.01)
  *F02N 11/00* (2006.01)
  *F16D 48/00* (2006.01)

(52) U.S. Cl.
  CPC ... *F16H 61/686* (2013.01); *B60W 2030/1809* (2013.01); *B60W 2030/18081* (2013.01); *B60W 2510/101* (2013.01); *B60W 2520/105* (2013.01); *B60W 2540/10* (2013.01); *B60W 2540/12* (2013.01); *B60W 2540/16* (2013.01); *B60W 2540/18* (2013.01); *B60W 2710/021* (2013.01); *B60W 2710/0644* (2013.01); *F02N 2200/0802* (2013.01); *F02N 2200/0808* (2013.01); *F02N 2200/101* (2013.01); *F02N 2200/102* (2013.01); *F16D 2500/3144* (2013.01); *F16D 2500/31426* (2013.01); *F16D 2500/31466* (2013.01); *F16D 2500/5085* (2013.01); *Y02T 10/76* (2013.01)

(56) References Cited

U.S. PATENT DOCUMENTS

| | | | | |
|---|---|---|---|---|
| 2013/0297123 | A1* | 11/2013 | Gibson | F16H 57/0006 701/22 |
| 2013/0304358 | A1* | 11/2013 | Matsunaga | F02D 41/00 701/110 |
| 2015/0158491 | A1* | 6/2015 | Suzuki | B60W 30/18072 701/67 |
| 2015/0166064 | A1* | 6/2015 | Mitsuyasu | F16H 61/21 701/54 |
| 2015/0166065 | A1 | 6/2015 | Kuroki et al. | |
| 2015/0266480 | A1 | 9/2015 | Kuroki et al. | |
| 2015/0274168 | A1 | 10/2015 | Kuroki et al. | |

FOREIGN PATENT DOCUMENTS

| | | |
|---|---|---|
| JP | 2014-083999 A | 5/2014 |
| JP | 2014-091398 A | 5/2014 |
| WO | WO-2012/111062 A1 | 8/2012 |
| WO | WO-2014/015864 A1 | 1/2014 |
| WO | WO-2014/064524 A1 | 5/2014 |
| WO | WO-2014/068723 A1 | 5/2014 |
| WO | WO-2014/068725 A1 | 5/2014 |

* cited by examiner

VEHICLE CONTROL DEVICE AND VEHICLE CONTROL METHOD

TECHNICAL FIELD

The present invention relates to a vehicle control device and a vehicle control method.

BACKGROUND ART

In JP2013-117274A, when a shift range corresponds to a travel range and a coasting control condition is established, a friction engaging element provided between an engine and a drive wheel is disengaged, and coasting control is executed to set an engine rotation speed at an idle rotation speed.

SUMMARY OF INVENTION

By setting the engine rotation speed at zero, the amount of fuel consumed by the engine is reduced when executing coasting control. As a result, an improvement in fuel efficiency can be achieved.

With the technique described above, however, the coasting control is halted when the shift range enters an N range, and therefore the coasting control is executed only when the shift range corresponds to the travel range. By executing the coasting control when the shift range corresponds to a range other than the travel range, a further improvement in fuel efficiency can be achieved.

An object of the present invention is to achieve an improvement in fuel efficiency by executing coasting control even when a shift range corresponds to a range other than a travel range.

According to one aspect of this invention, a vehicle control device for controlling a vehicle in which a friction engaging element is provided between a drive source and a drive wheel, includes a control unit configured to execute coasting control to disengage the friction engaging element and set a rotation speed of a rotary shaft of the drive source at zero when a shift range corresponds to a travel range and a coasting condition is established, wherein the control unit is configured to execute the coasting control when the shift range is modified to a neutral range.

According to another aspect of this invention, a vehicle control method for controlling a vehicle in which a friction engaging element is provided between a drive source and a drive wheel, includes executing coasting control to disengage the friction engaging element and set a rotation speed of a rotary shaft of the drive source at zero when a shift range corresponds to a travel range and a coasting condition is established, and executing the coasting control when the shift range is modified to a neutral range.

According to these aspects, the coasting control is executed even when the shift range corresponds to the neutral range, and as a result, the fuel efficiency of the drive source can be improved.

DESCRIPTION OF EMBODIMENTS

An embodiment of the present invention will be described below with reference to the attached figures. It should be noted that in the following description, a "speed ratio (gear position)" of a certain transmission mechanism is a value obtained by dividing an input rotation speed of the transmission mechanism by an output rotation speed of the transmission mechanism, and a large speed ratio (gear position) will be referred to as "Low", while a small speed ratio (gear position) will be referred to as "High".

Figure 1:
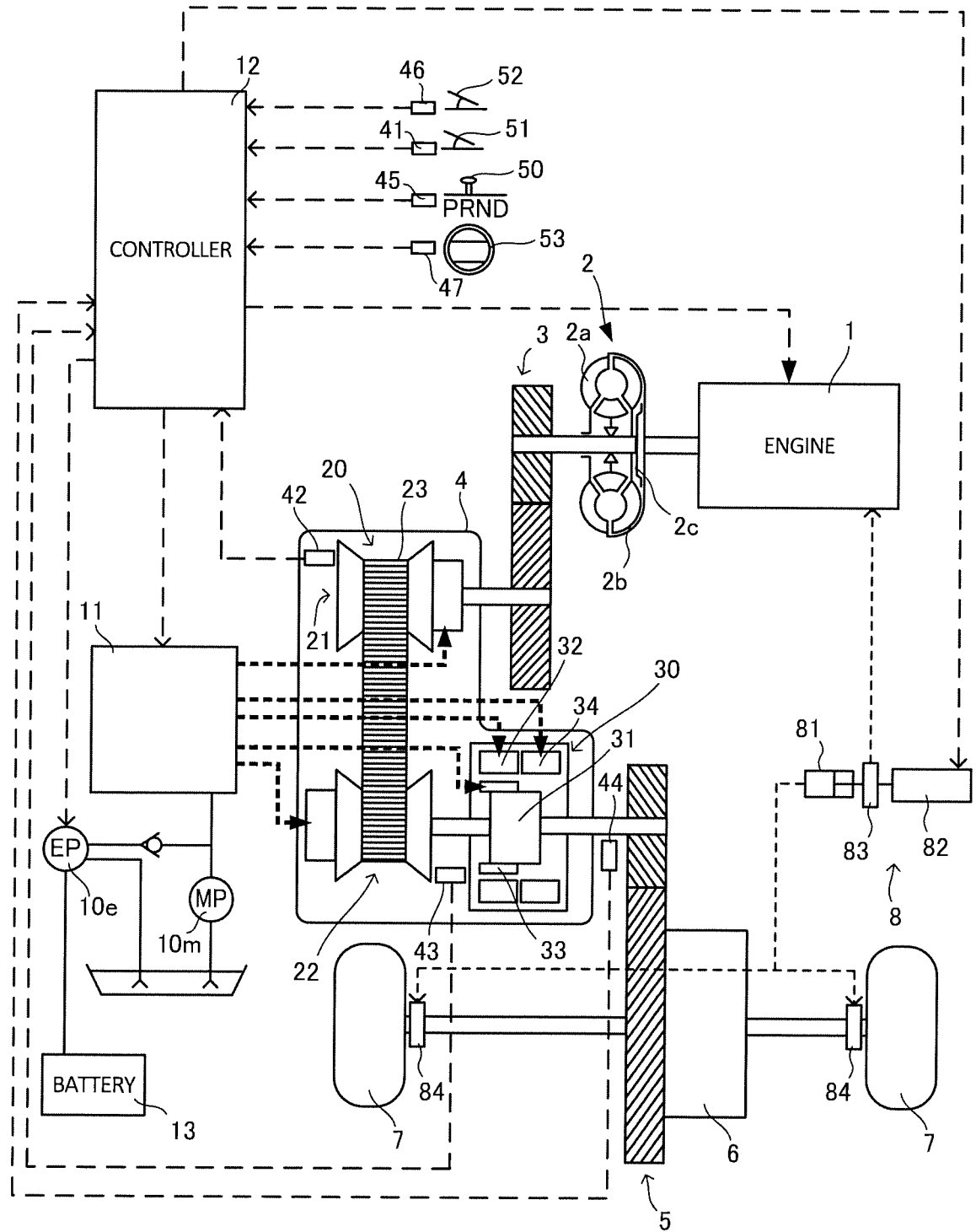
FIG. 1 is a schematic view showing a configuration of a vehicle according to an embodiment.

FIG. 1 is a schematic view showing a configuration of a vehicle according to this embodiment of the present invention. The vehicle includes an engine 1 as a drive source, output rotation from the engine 1 being input into a pump impeller 2a of a torque converter 2 having a lockup clutch 2c and then transmitted from a turbine runner 2b to drive wheels 7 via a first gear train 3, a transmission 4, a second gear train 5, and a differential device 6. Further, when a brake pedal 52 is depressed, braking force is generated by a brake device 8, and as a result, the vehicle is decelerated and stopped.

The transmission 4 is provided with a mechanical oil pump 10m that receives the rotation of the engine 1 and is driven using a part of the power of the engine 1, and an electric oil pump 10e that receives and is driven by a power supply from a battery 13. The transmission 4 is provided with an oil pressure control circuit 11 that adjusts oil pressure generated by oil discharged from the mechanical oil pump 10m or the electric oil pump 10e, and supplies the adjusted oil pressure to respective sites of the transmission 4.

The transmission 4 includes a belt type continuously variable transmission mechanism (referred to hereafter as a "variator 20") that serves as a friction transmission mechanism, and a sub-transmission mechanism 30 provided in series with the variator 20. "Provided in series" means that the variator 20 and the sub-transmission mechanism 30 are provided in series on a power transmission path from the engine 1 to the drive wheels 7. The sub-transmission mechanism 30 may be connected directly to an output shaft of the variator 20, as in this example, or may be connected thereto via another transmission mechanism or power transmission mechanism (a gear train, for example).

The variator 20 includes a primary pulley 21, a secondary pulley 22, and a V belt 23 wound around the pulleys 21, 22. In the variator 20, a width of a V groove varies in accordance with a primary pressure Ppri and a secondary pressure Psec, causing contact radii between the V belt 23 and the respective pulleys 21, 22 to vary, and as a result, the speed ratio of the variator 20 varies continuously.

The sub-transmission mechanism 30 is a two-forward speed/one-reverse speed transmission mechanism. The sub-transmission mechanism 30 includes a Ravigneaux type planetary gear mechanism 31 in which carriers of two planetary gears are coupled to each other, and a plurality of friction engaging elements (a Low brake 32, a High clutch 33, and a Rev brake 34) that are connected to a plurality of rotary elements constituting the Ravigneaux type planetary gear mechanism 31 in order to modify engagement conditions thereof. The gear position of the sub-transmission mechanism 30 is modified by adjusting the oil pressure supplied to the respective friction engaging elements 32 to 34 so as to modify respective engagement/disengagement conditions of the friction engaging elements 32 to 34.

When the Low brake 32 is engaged and the High clutch 33 and Rev brake 34 are disengaged, the gear position of the sub-transmission mechanism 30 shifts to a first speed. When the High clutch 33 is engaged and the Low brake 34 and Rev brake 34 are disengaged, the gear position of the sub-transmission mechanism 30 shifts to a second speed. Further, when the Rev brake 34 is engaged and the Low brake 32 and High clutch 33 are disengaged, the gear position of the sub-transmission mechanism 30 shifts to reverse.

By modifying the speed ratio of the variator 20 and the gear position of the sub-transmission mechanism 30, a through speed ratio serving as an overall speed ratio of the transmission 4 is modified.

The brake device 8 is an electronically controlled brake in which the brake pedal 52 and a master cylinder 81 are mechanistically independent. When a driver depresses the brake pedal 52, a brake actuator 82 displaces a piston of the master cylinder 81 via a brake booster 83 such that oil pressure corresponding to a requested deceleration requested by the driver is supplied to a brake 84, and as a result, braking force is generated. The brake booster 83 assists generation of the braking force using negative pressure generated when the engine 1 is operative. Although not shown in the figures, the brake device 8 is also provided on driven wheels.

Figure 2:
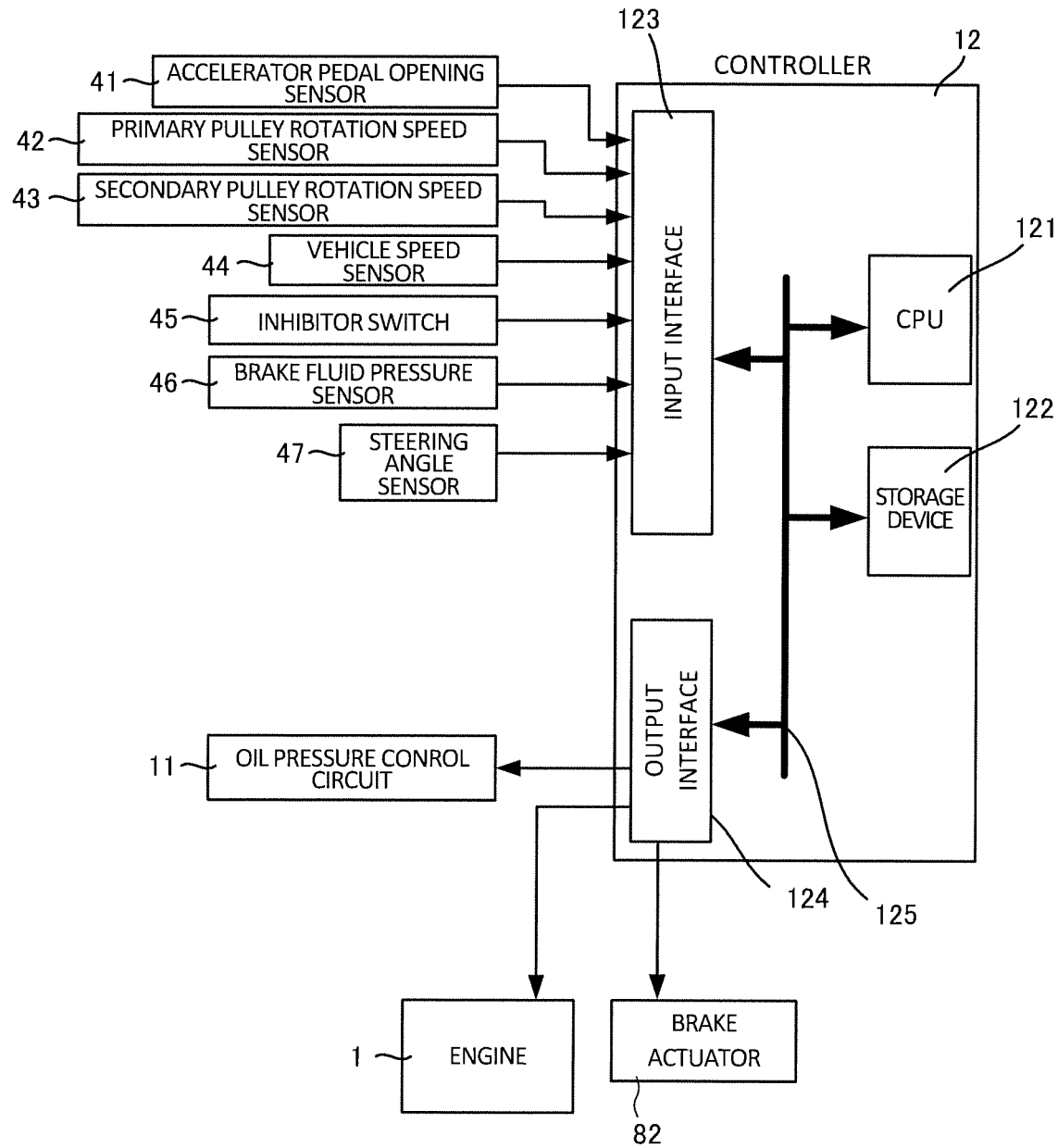
FIG. 2 is a block diagram illustrating a controller.

A controller 12 performs overall control of the engine 1 and the transmission 4, and as shown in FIG. 2, the controller 12 is constituted by a CPU 121, a storage device 122 including RAM and ROM, an input interface 123, an output interface 124, and a bus 125 connecting these components to each other.

An output signal from an accelerator pedal opening sensor 41 that detects an accelerator pedal opening APO, which is an operation amount of an accelerator pedal 51, an output signal from a primary pulley rotation speed sensor 42 that detects a primary pulley rotation speed Npri, an output signal from a secondary pulley rotation speed sensor 43 that detects a secondary pulley rotation speed Nsec, an output signal from a vehicle speed sensor 44 that detects a vehicle speed VSP, an output signal from an inhibitor switch 45 that detects a position of a shift lever 50, an output signal from a brake fluid pressure sensor 46 that detects a brake fluid pressure corresponding to an operation amount BRP of the brake pedal 52, an output signal from a steering angle sensor 47 that detects an operation amount θ of a steering wheel 53, and so on are input into the input interface 123.

The storage device 122 stores a control program for the engine 1, a shift control program for the transmission 4, and various maps and tables used by these programs. The CPU 121 reads and executes the programs stored in the storage device 122, generates a fuel injection amount signal, an ignition timing signal, a throttle opening signal, a shift control signal, and a brake actuator control signal by implementing various types of calculation processing on the various signals input therein via the input interface 123, and outputs the generated signals to the engine 1, the oil pressure control circuit 11, and the brake actuator 82 via the output interface 124. Various values used by the CPU 121 during the calculation processing, and calculation results obtained in relation thereto, are stored as appropriate in the storage device 122.

The oil pressure control circuit 11 is constituted by a plurality of flow passages and a plurality of oil pressure control valves. The oil pressure control circuit 11 switches an oil pressure supply path by controlling the plurality of oil pressure control valves on the basis of the shift control signal from the controller 12, prepares a required oil pressure from an oil pressure generated by the oil discharged from the mechanical oil pump 10m or the electric oil pump 10e, and supplies the required oil pressure to the respective sites of the transmission 4. In so doing, the speed ratio of the variator 20 and the gear position of the sub-transmission mechanism 30 are modified, and as a result, the transmission 4 implements a shift.

In this embodiment, coasting control, in which coasting is performed by disengaging the respective friction engaging elements 32 to 34 of the sub-transmission mechanism 30 and halting fuel injection into the engine 1 such that the rotation speed of the rotary shaft of the engine 1 (referred to hereafter as an engine rotation speed Ne) falls to zero, can be executed in cases where the accelerator pedal 51 is not depressed and so on. By executing the coasting control, deceleration by engine braking is prevented, a coasting distance is increased, and travel implemented by driving the engine 1 is reduced while coasting to a desired position. As a result, an amount of fuel consumed by the engine 1 can be reduced, leading to an improvement in fuel efficiency.

Figure 3:
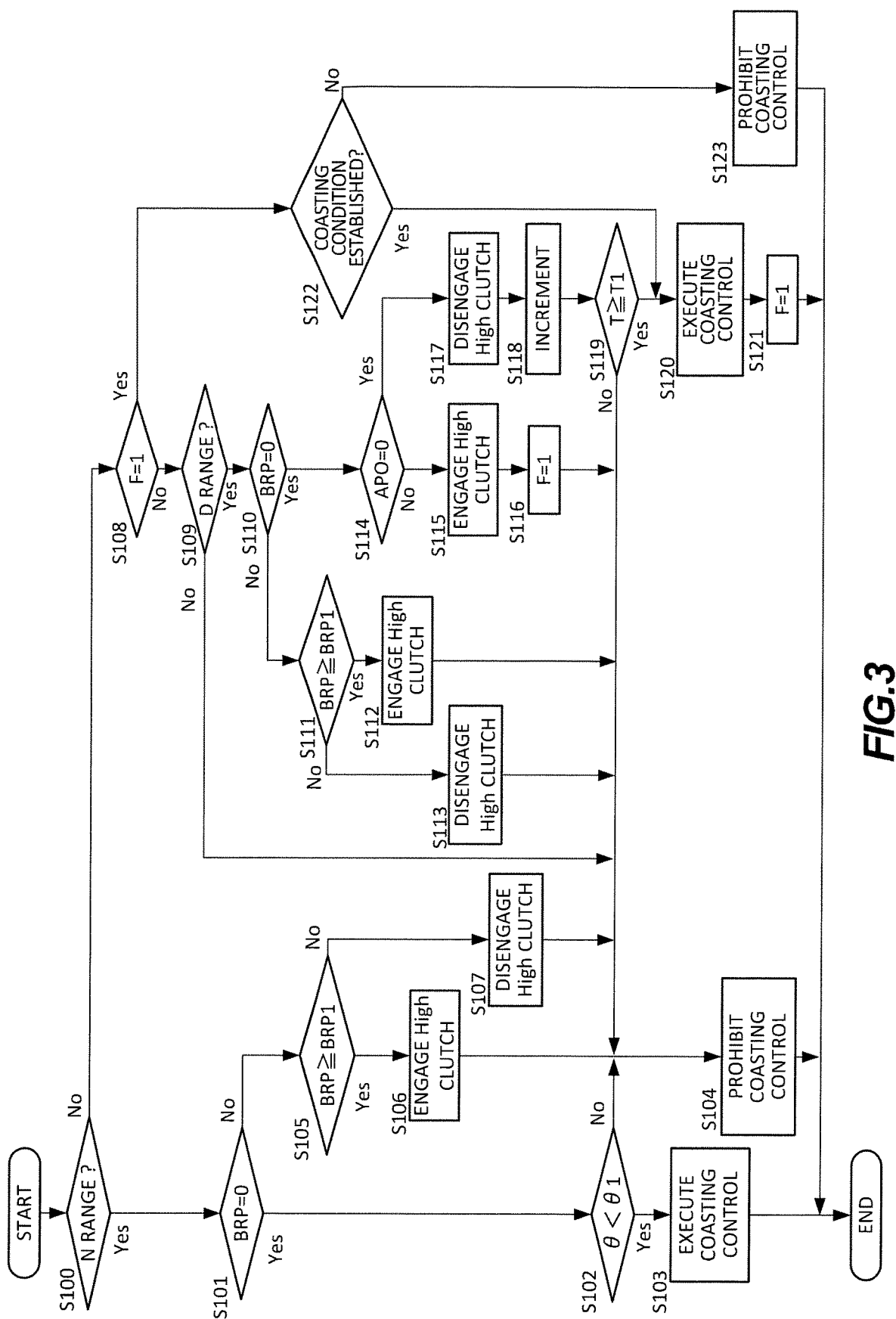
FIG. 3 is a flowchart illustrating coasting control according to this embodiment.

Next, the coasting control according to this embodiment will be described using a flowchart shown in FIG. 3. It is assumed hereafter that the vehicle is in motion and the High clutch 33 of the sub-transmission mechanism 30 is either engaged or disengaged.

In step S100, the controller 12 determines whether or not the shift lever 50 is in an N range (a neutral range). The controller 12 detects the position of the shift lever 50, or in other words the current shift range, on the basis of the signal from the inhibitor switch 45. When the shift lever 50 is in the N range, the processing advances to step S101, and when the shift lever 50 is not in the N range, the processing advances to step S108.

In step S101, the controller 12 determines whether or not the brake pedal 52 is depressed. The controller 12 detects the operation amount BRP of the brake pedal 52 on the basis of the signal from the brake fluid pressure sensor 46. When the brake pedal 52 is not depressed such that the operation amount BRP of the brake pedal 52 is zero, the processing advances to step S102, and when the brake pedal 52 is depressed such that the operation amount BRP of the brake pedal 52 is not zero, the processing advances to step S105.

In step S102, the controller 12 determines whether or not the steering wheel 53 has been operated. The controller 12 determines whether or not the operation amount θ of the steering wheel 53 is smaller than a first operation amount θ1 on the basis of the signal from the steering angle sensor 47. The operation amount θ is an operation amount relative to a reference position, and the reference position is the position of the steering wheel 53 when the vehicle travels in a straight line. The first operation amount θ1 is a preset value for determining whether or not the driver intends to drive the vehicle in a straight line. When the steering wheel 53 has not been operated such that the operation amount θ of the steering wheel 53 is smaller than the first operation amount θ1, the processing advances to step S103, and when the steering wheel 53 has been operated such that the operation amount θ of the steering wheel 53 is equal to or greater than the first operation amount θ1, the processing advances to step S104.

In step S103, the controller 12 executes the coasting control. The controller 12 disengages the High clutch 33 of the sub-transmission mechanism 30 and halts fuel injection into the engine 1 so that the engine rotation speed Ne falls to zero. When the shift lever 50 is in the N range, the coasting control is executed regardless of whether or not the accelerator pedal 51 is depressed.

In step S104, the controller 12 prohibits the coasting control. When the coasting control is underway, the controller 12 halts the coasting control and restarts the engine 1. It should be noted that in this processing, the engagement/disengagement condition of the High clutch 33 is not switched.

When it is determined in step S101 that the brake pedal 52 is depressed, the controller 12 determines in step S105 whether or not the operation amount BRP of the brake pedal 52 equals or exceeds a second operation amount BRP1. The second operation amount BRP1 is set in advance at a value for determining whether the operation amount BRP applied to the brake pedal 52 by the driver corresponds to gentle deceleration or rapid deceleration. Gentle deceleration is deceleration for increasing a vehicle-to-vehicle distance to a preceding vehicle, for example, while rapid deceleration is deceleration in which the brake pedal 52 is depressed by a larger amount than during gentle deceleration, and is employed in cases where the driver intends to stop the vehicle, avoid contact with a preceding vehicle or an obstruction, and so on, for example. When the operation amount BRP of the brake pedal 52 equals or exceeds the second operation amount BRP1, it is determined that rapid deceleration has been requested, and the processing advances to step S106. When the operation amount BRP of the brake pedal 52 is smaller than the second operation amount BRP1, it is determined that gentle deceleration has been requested, and the processing advances to step S107.

In step S106, the controller 12 engages the High clutch 33. By engaging the High clutch 33 when rapid deceleration is requested, braking force can be generated by engine braking in addition to the braking force generated by the brake device 8. It should be noted that when the engine 1 is stopped, the High clutch 33 is engaged by supplying oil pressure generated by oil discharged from the electric oil pump 10e to the High clutch 33.

In step S107, the controller 12 disengages the High clutch 33. When gentle deceleration is requested, the deceleration is temporary, and therefore the brake pedal 52 is likely to be released. By disengaging the High clutch 33 in this case, the coasting control can be started as soon as the brake pedal 52 is released.

When it is determined in step S100 that the shift lever 50 is not in the N range, the controller 12 determines in step S108 whether or not a flag is at "1". When the flag is at "0", the processing advances to step S109, and when the flag is at "1", the processing advances to step S122.

In step S109, the controller 12 determines whether or not the shift lever 50 is in a D range. When the shift lever 50 is in the D range, the processing advances to step S110, and when the shift lever 50 is in a P range or an R range, the processing advances to step S104.

In step S110, the controller 12 determines whether or not the brake pedal 52 is depressed. When the brake pedal 52 is not depressed such that the operation amount BRP of the brake pedal 52 is zero, the processing advances to step S114, and when the brake pedal 52 is depressed such that the operation amount BRP of the brake pedal 52 is not zero, the processing advances to step S111.

In step S111, the controller 12 determines whether or not the operation amount BRP of the brake pedal 52 equals or exceeds the second operation amount BRP1. When the operation amount BRP of the brake pedal 52 equals or exceeds the second operation amount BRP1, it is determined that rapid deceleration has been requested, and the processing advances to step S112. When the operation amount BRP of the brake pedal 52 is smaller than the second operation amount BRP1, it is determined that gentle deceleration has been requested, and the processing advances to step S113. It should be noted that the second operation amount BRP1 corresponds to a predetermined amount in claim 3.

In step S112, the controller 12 engages the High clutch 33.

In step S113, the controller 12 disengages the High clutch 33.

In step S114, the controller 12 determines whether or not the accelerator pedal 51 is depressed. The controller 12 detects the accelerator pedal opening APO on the basis of the signal from the accelerator pedal opening sensor 41. When the accelerator pedal 51 is depressed such that the accelerator pedal opening APO is not zero, the processing advances to step S115, and when the accelerator pedal 51 is not depressed such that the accelerator pedal opening APO is zero, the processing advances to step S117.

In step S115, the controller 12 engages the High clutch 33. By engaging the High clutch 33 when the shift lever 50 is in the D range and the accelerator pedal 51 is depressed, torque can be transmitted from the engine 1 to the drive wheels 7 early when the coasting control is halted and the engine 1 is restarted thereafter.

In step S116, the controller 12 sets the flag at "1". It should be noted that as an initial value, the flag is set at "0". When the shift lever 50 is operated to a range other than the D range, the flag is reset to "0".

In step S117, the controller 12 disengages the High clutch 33. When the shift lever 50 is in the D range and the accelerator pedal 51 is not depressed, the High clutch 33 is disengaged. In so doing, power transmission through the High clutch 33 is prevented such that torque is prevented from being transmitted to the drive wheels 7 from the engine 1, and as a result, thrusting shock can be prevented from occurring. Further, the transmission of coasting torque from the drive wheels 7 to the engine 1 is prevented, thereby preventing an increase in engine braking, and as a result, deceleration shock can be prevented from occurring.

In step S118, the controller 12 increments a value T of a timer. It should be noted that when counting using the timer has not yet been started, the controller 12 starts counting. The controller 12 uses the timer to calculate the duration of a condition in which the shift lever 50 is in the D range and the accelerator pedal 51 is not depressed.

In step S119, the controller 12 determines whether or not the value T of the timer equals or exceeds a predetermined time T1. The predetermined time T1 is a time at which it can be determined that neither an acceleration request nor a deceleration request has been issued by the driver. When the value T of the timer equals or exceeds the predetermined time T1, the controller 12 determines that the driver does not wish to accelerate. When the value T of the timer equals or exceeds the predetermined time T1, the processing advances to step S120, and when the value T of the timer is smaller than the predetermined time T1, the processing advances to step S104.

It should be noted that in this embodiment, when the shift lever 50 is modified from the N range to the D range, the processing advances to step S104, where the coasting control is halted (prohibited). Likewise in step S119, the processing advances to step S104 until the value T of the timer equals or exceeds the predetermined time T1.

In step S120, the controller 12 executes the coasting control.

In step S121, the controller 12 sets the flag at "1".

When it is determined in step S108 that the flag is at "1", the controller 12 determines in step S122 whether or not a coasting control start condition is satisfied. The coasting control start condition is satisfied when the accelerator pedal opening APO is zero, the operation amount BRP of the brake pedal 52 is zero, and this condition remains continuously established for at least the predetermined time T1. When the coasting control start condition is satisfied, the processing advances to step S120, and when the coasting control start condition is not satisfied, the processing advances to step S123. It should be noted that the coasting condition may include other conditions. The other conditions are, for example, an oil temperature is within an appropriate temperature range, a road surface gradient is within a predetermined gradient, the speed ratio of the variator 20 is at a Highest level, and so on.

In step S123, the controller 12 prohibits the coasting control. When the coasting control is underway, the controller 12 halts the coasting control. In this processing, the engine 1 is restarted and the High clutch 33 is engaged.

Next, the coasting control according to this embodiment will be described using time charts shown in FIGS. 4A to 4G.

Figure 4A:
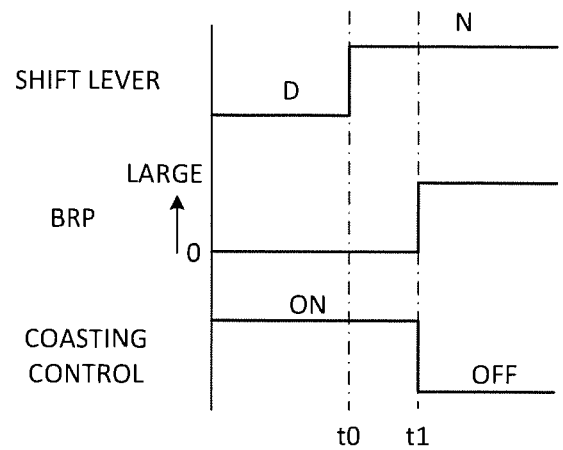
FIG. 4A is a time chart illustrating the coasting control according to this embodiment.

FIG. 4A is a time chart showing a case in which the shift lever 50 is modified from the D range to the N range while the coasting control is underway. At a time t0, the shift lever 50 is modified from the D range to the N range (step S100: "Yes"). Here, the brake pedal 52 is not depressed (step S101: "Yes"), and the steering wheel 53 has not been operated (step S102: "Yes"). In this case, the coasting control is continued without being halted.

When the brake pedal 52 is depressed (step S101: "No") at a time t1, the coasting control is halted.

Figure 4B:
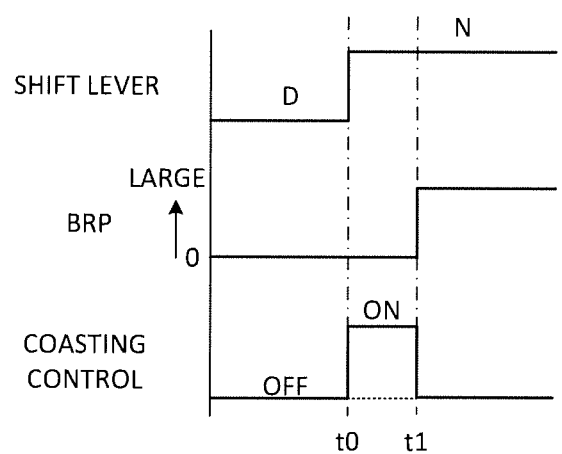
FIG. 4B is a time chart illustrating the coasting control according to this embodiment.

FIG. 4B is a time chart showing a case in which the shift lever 50 is modified from the D range to the N range while the coasting control is not underway. At the time t0, the shift lever 50 is modified from the D range to the N range (step S100: "Yes"). Here, the brake pedal 52 is not depressed, and the steering wheel 53 has not been operated (step S101: "Yes", step S102: "Yes"). In this case, the coasting control is started at the same time as the shift lever 50 is modified to the N range at the time t0.

When the brake pedal 52 is depressed (step S101: "No") at the time t1, the coasting control is halted.

Figure 4C:
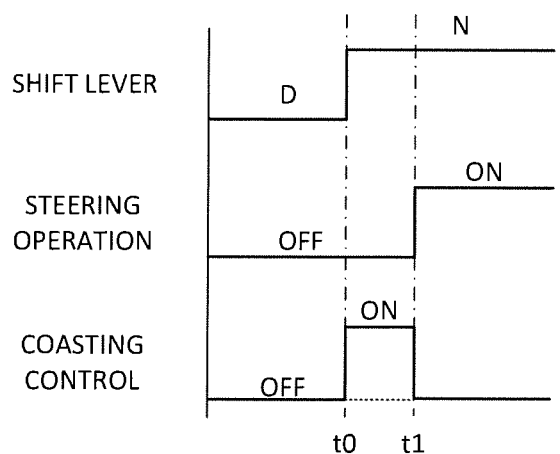
FIG. 4C is a time chart illustrating the coasting control according to this embodiment.

FIG. 4C is a time chart showing a case in which the steering wheel 53 is operated while the coasting control is underway. At the time t0, the shift lever 50 is modified from the D range to the N range (step S100: "Yes"). Here, the steering wheel 53 has not been operated (step S102: "Yes"). In this case, the coasting control is started at the same time as the shift lever 50 is modified to the N range at the time t0.

When the steering wheel 53 is operated at the time t1 such that the operation amount θ of the steering wheel 53 reaches or exceeds the first operation amount θ1 (step S102: "No"), the coasting control is halted. When the engine 1 stops, assistance is no longer provided by power steering, and therefore the operability of the steering wheel 53 decreases.

Hence, by halting the coasting control and restarting the engine 1 when the operation amount θ of the steering wheel 53 reaches or exceeds the first operation amount θ1, a reduction in the operability of the steering wheel 53 can be prevented.

Figure 4D:
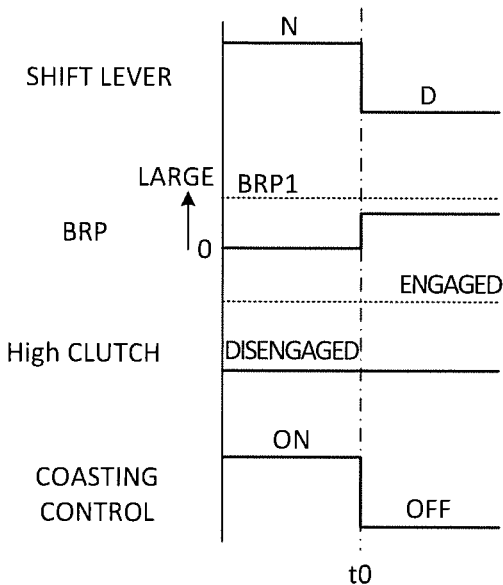
FIG. 4D is a time chart illustrating the coasting control according to this embodiment.

FIG. 4D is a time chart showing a case in which the shift lever 50 is modified from the N range to the D range and the brake pedal 52 is depressed while the coasting control is underway. At the time t0, the shift lever 50 is modified from the N range to the D range (step S100: "No", step S109: "Yes") and the brake pedal 52 is depressed (step S110: "No"). When the operation amount BRP of the brake pedal 52 remains smaller than the second operation amount BRP1 (step S111: "No"), the High clutch 33 is kept disengaged, and the coasting control is halted.

Figure 4E:
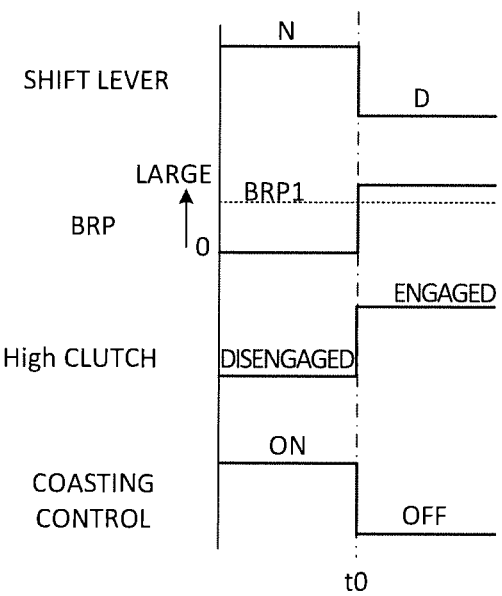
FIG. 4E is a time chart illustrating the coasting control according to this embodiment.

FIG. 4E is a time chart showing a case in which the shift lever 50 is modified from the N range to the D range and the brake pedal 52 is depressed while coasting is underway. At the time t0, the shift lever 50 is modified from the N range to the D range (step S100: "No", step S109: "Yes") and the brake pedal 52 is depressed (step S110: "No"). When the operation amount BRP of the brake pedal 52 reaches or exceeds the second operation amount BRP1 (step S111: "Yes"), the High clutch 33 is engaged, and the coasting control is halted.

Figure 4F:
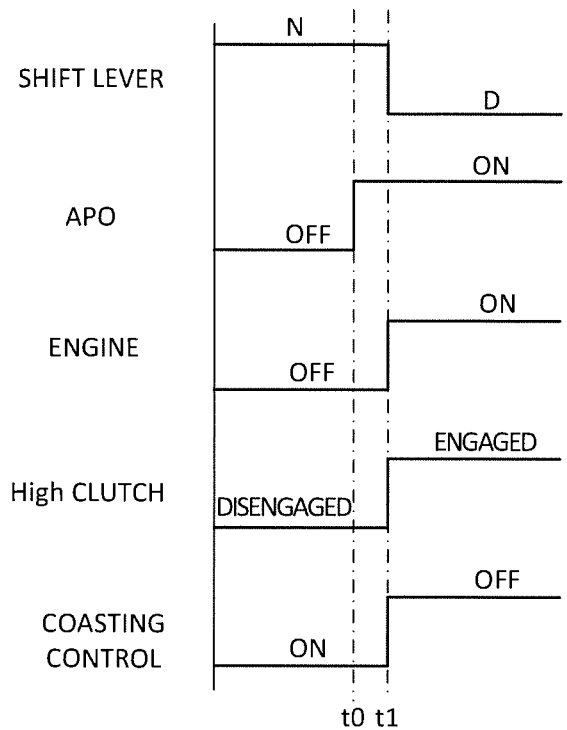
FIG. 4F is a time chart illustrating the coasting control according to this embodiment.

FIG. 4F is a time chart showing a case in which the shift lever 50 is modified from the N range to the D range while the coasting control is underway. At the time t0, the accelerator pedal 51 is depressed while the shift lever 50 is in the N range. According to this embodiment, the coasting control is continued in this case.

When the shift lever 50 is modified from the N range to the D range (step S100: "No", step S109: "Yes") at the time t1, the accelerator pedal 51 is already depressed (step S114: "No"), and therefore the High clutch 33 is engaged and the coasting control is halted. Accordingly, the engine 1 is restarted.

Figure 4G:
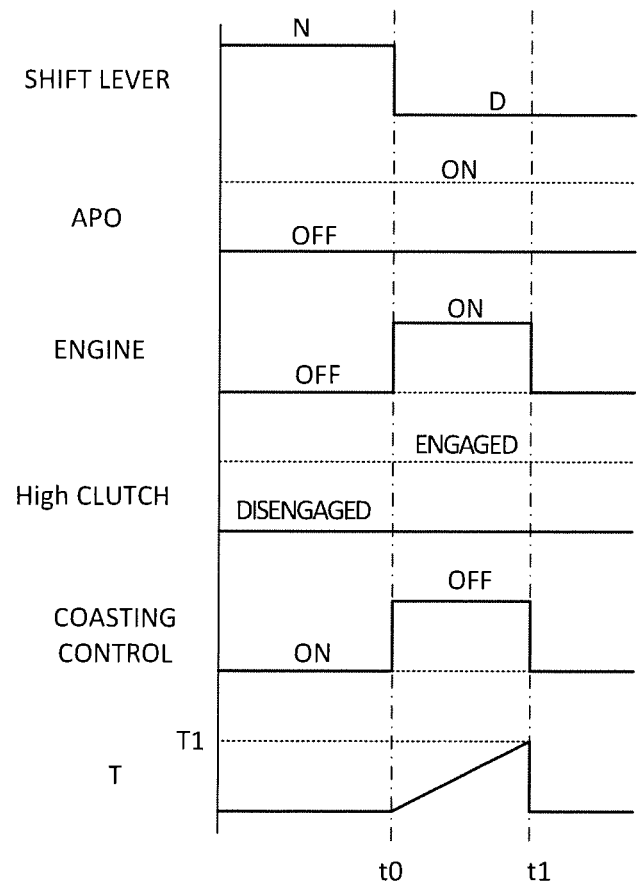
FIG. 4G is a time chart illustrating the coasting control according to this embodiment.

FIG. 4G is a time chart showing a case in which the shift lever 50 is modified from the N range to the D range while the coasting control is underway. At the time t0, the shift lever 50 is modified from the N range to the D range (step S100: "No", step S109: "Yes"). Here, the accelerator pedal 51 is not depressed (step S114: "Yes"), and therefore the High clutch 33 remains disengaged and the value T of the timer remains smaller than the predetermined time T1 (step S119: "No"). Hence, the coasting control is halted, and accordingly, the engine 1 is restarted.

When the value T of the timer reaches the predetermined time T1 (step S115: "Yes") at the time t1, the coasting control is started and the engine 1 is stopped.

Effects of this embodiment of the present invention will now be described.

When the shift lever 50 is operated to the N range, the coasting control is executed. When the shift lever 50 is operated to the N range, the driver does not wish to accelerate. Hence, there is no need to generate driving force by transmitting torque to the drive wheels 7, and therefore the engine 1 is stopped and the coasting control is executed. Further, since the driver does not wish to accelerate, the driver is not disturbed when the coasting control is started. By executing the coasting control even when the shift lever 50 is in the N range in this manner, the amount of fuel consumed by the engine 1 can be reduced, and as a result, an improvement in fuel efficiency can be achieved without disturbing the driver.

Further, when the coasting control is halted in a case where the shift lever 50 is operated from the D range to the N range while the coasting control is underway, the engine 1 is restarted even though the driver does not wish to accelerate, and as a result, the driver is disturbed. Moreover, when the High clutch 33 is engaged after the coasting control is halted, torque is transmitted to the drive wheels 7 from the engine 1 such that thrusting shock is generated, and engine braking occurs such that deceleration shock is generated, causing the driver to feel disturbed. According to this embodiment, the coasting control is continued in such a case, and therefore thrusting shock and deceleration shock can be prevented from occurring.

When the coasting control is executed while the brake pedal 52 is depressed, the engine 1 is stopped, and as a result, braking force generation cannot be assisted by the brake booster 83. According to this embodiment, however, the coasting control is prohibited, or the coasting control is halted if already underway, when the brake pedal 52 is depressed. Therefore, when the brake pedal 52 is depressed, braking force generation can be assisted by the brake booster 83, and as a result, desired braking force can be generated.

When gentle deceleration, in which the operation amount BRP of the brake pedal 52 is smaller than the second operation amount BRP1, is implemented, the brake pedal 52 is likely to be released thereafter. If the High clutch 33 is engaged in this case, disengagement of the High clutch 33 may be delayed when the brake pedal 52 is released and the coasting control is started. When disengagement of the High clutch 33 is delayed, engine braking increases, causing deceleration shock to occur due to deceleration not desired by the driver, and as a result, the driver may be disturbed. Moreover, the drive wheels 7 remain coupled to the engine 1 until the High clutch 33 is completely disengaged such that braking force generated by engine braking acts thereon, and as a result, the coasting distance decreases. In this embodiment, the High clutch 33 is disengaged during gentle deceleration. By disengaging the High clutch 33, deceleration shock does not occur even when the coasting control is started as soon as the brake pedal 52 is released, and therefore the driver can be prevented from feeling disturbed. Furthermore, since there is no need to disengage the High clutch 33, braking force generated by engine braking does not act on the drive wheels 7, and therefore the coasting control can be started early, enabling an improvement in fuel efficiency.

When rapid deceleration, in which the operation amount BRP of the brake pedal 52 equals or exceeds the second operation amount BRP1, is implemented, the High clutch 33 is engaged. In so doing, engine braking can be generated, and as a result, a responsiveness of the braking force to depression of the brake pedal 52 can be improved. In particular, large engine braking can be generated when the engine 1 is not restarted.

The coasting control is executed even when the accelerator pedal 51 is depressed while the shift lever 50 is in the N range. When the shift lever 50 is in the N range, the driver does not wish to accelerate. In this embodiment, therefore, the operation of the shift lever 50 is prioritized such that the coasting control is executed even when the accelerator pedal 51 is depressed while the shift lever 50 is in the N range. In so doing, an improvement in fuel efficiency can be achieved.

When the shift lever 50 is modified from the N range to the D range while the coasting control is underway, the accelerator pedal 51 is likely to be depressed thereafter, for example. In this embodiment, when the shift lever 50 is modified from the N range to the D range while the coasting control is underway, the coasting control is halted and the engine 1 is restarted regardless of whether or not the coasting condition is established. Hence, when the driver depresses the accelerator pedal 51 thereafter, torque can be transmitted quickly from the engine 1 to the drive wheels 7, enabling an improvement in driving force responsiveness.

When the shift lever 50 is modified from the N range to the D range and the accelerator pedal 51 is depressed while the coasting control is underway, the High clutch 33 is engaged. In so doing, torque can be transmitted quickly from the engine 1 to the drive wheels 7 when the coasting control is halted and the engine 1 is restarted, and as a result, the driving force responsiveness can be improved.

Moreover, when the shift lever 50 is modified from the N range to the D range but the accelerator pedal 51 is not depressed while the coasting control is underway, the High clutch 33 is disengaged. In so doing, torque transmission from the engine 1 to the drive wheels 7 can be prevented in a case where an engine 1 side rotation speed of the High clutch 33 is higher than a drive wheel 7 side rotation speed of the High clutch 33, and as a result, the occurrence of thrusting shock can be prevented. Furthermore, an increase in engine braking can be prevented in a case where the engine 1 side rotation speed is lower than the drive wheel 7 side rotation speed, and as a result, the occurrence of deceleration shock can be prevented. It should be noted that when the shift lever 50 is modified from the N range to the D range, the coasting control is halted and the engine 1 is started, and therefore a sufficient oil discharge amount from the mechanical oil pump 10m is secured. Accordingly, the High clutch 33 can be engaged quickly when the accelerator pedal 51 is depressed thereafter.

When a condition in which the shift lever 50 is in the D range and the accelerator pedal 51 is not depressed remains established for the predetermined time T1, it is determined that the driver does not wish to accelerate, and therefore the coasting control is executed. As a result, an improvement in fuel efficiency can be achieved.

An embodiment of the present invention was described above, but the above embodiment illustrates only a part of the example applications of the present invention, and the technical scope of the present invention is not limited to the specific configurations of the above embodiment.

In the above embodiment, a vehicle in which the shift range is switched by the shift lever 50 was described, but the present invention is not limited thereto, and the coasting control described above may also be executed on a vehicle in which the shift range is switched by a switch.

This embodiment was described using a vehicle that employs the engine 1 as a drive source, but the coasting control described above may also be applied to an electric vehicle that employs a motor as a drive source, or a hybrid vehicle. The coasting control may also be applied to a vehicle in which friction engaging elements are provided between the variator 20 and the engine 1.

When the coasting control is halted, the Low brake 32 may be engaged.

In this embodiment, the coasting control is prohibited (halted) when the operation amount θ of the steering wheel 53 equals or exceeds the first operation amount θ1, but in the case of an electric power steering, the coasting control may be executed.

With respect to the above description, the contents of application No. 2015-53523, with a filing date of Mar. 17, 2015 in Japan, are incorporated herein by reference.

The invention claimed is:

1. A vehicle control device for controlling a vehicle in which a friction engaging element is provided between a drive source and a drive wheel, comprising:

a controller configured to execute coasting control to disengage the friction engaging element and set a rotation speed of a rotary shaft of the drive source at zero when a shift range corresponds to a travel range and a coasting condition is established, the shift range being selected by a driver,
wherein the controller is configured to
execute the coasting control when the shift range is modified to a neutral range, and
execute the coasting control when the shift range corresponds to the neutral range and an accelerator pedal is depressed.

2. The vehicle control device according to claim 1, wherein
the drive source is an engine,
the vehicle comprises a brake device configured to generate braking force using negative pressure of the engine when a brake pedal is depressed, and
the controller is configured to halt the coasting control when the shift range corresponds to the neutral range and the brake pedal is depressed.

3. The vehicle control device according to claim 2, wherein
the controller is configured to disengage the friction engaging element during a deceleration in which an operation amount of the brake pedal is smaller than a predetermined amount, and engage the friction engaging element during a deceleration in which the operation amount of the brake pedal equals or exceeds the predetermined amount.

4. The vehicle control device according to claim 1, wherein the controller is configured to restart the drive source when the shift range is modified from the neutral range to the travel range.

5. The vehicle control device according to claim 4, wherein the controller is configured to engage the friction engaging element when the accelerator pedal is depressed, and disengage the friction engaging element when the accelerator pedal is not depressed.

6. The vehicle control device according to claim 5, wherein the controller is configured to execute the coasting control when the accelerator pedal is not depressed for a predetermined time.

7. A vehicle control method for controlling a vehicle in which a friction engaging element is provided between a drive source and a drive wheel, comprising:
executing coasting control to disengage the friction engaging element and set a rotation speed of a rotary shaft of the drive source at zero when a shift range corresponds to a travel range and a coasting condition is established, the shift range being selected by a driver;
executing the coasting control when the shift range is modified to a neutral range; and
executing the coasting control when the shift range corresponds to the neutral range and an accelerator pedal is depressed.

8. A vehicle control device for controlling a vehicle in which a friction engaging element is provided between a drive source and a drive wheel, comprising:
control means for executing coasting control to disengage the friction engaging element and set a rotation speed of a rotary shaft of the drive source at zero when a shift range corresponds to a travel range and a coasting condition is established, the shift range being selected by a driver,
wherein the control means executes the coasting control when the shift range is modified to a neutral range, and executes the coasting control when the shift range corresponds to the neutral range and an accelerator pedal is depressed.

* * * * *